United States Patent
Williams (10) Patent No.: US 7,430,354 B2
(45) Date of Patent: Sep. 30, 2008

(54) METHOD AND APPARATUS FOR REDUCTION OF OPTICAL COUPLING BETWEEN PUMP LASERS AND PHOTODETECTORS IN OPTICAL AMPLIFIERS

(75) Inventor: Martin R. Williams, Corning, NY (US)

(73) Assignee: Avanex Corporation, Fremont, CA (US)

( * ) Notice: Subject to any disclaimer, the term of this patent is extended or adjusted under 35 U.S.C. 154(b) by 0 days.

(21) Appl. No.: 10/927,907

(22) Filed: Aug. 26, 2004

(65) Prior Publication Data

US 2006/0045452 A1 Mar. 2, 2006

(51) Int. Cl.
*G02B 6/02* (2006.01)
(52) U.S. Cl. ...................................................... 385/128
(58) Field of Classification Search ................ None
See application file for complete search history.

(56) References Cited

U.S. PATENT DOCUMENTS 4,198,568 A * 4/1980 Robbins et al. .......... 250/459.1
6,310,717 B1 * 10/2001 Naganuma et al. ....... 359/341.1
2001/0055456 A1 * 12/2001 Ellison et al. ............... 385/127

\* cited by examiner

*Primary Examiner*—Sung Pak
*Assistant Examiner*—Hoang Tran
(74) *Attorney, Agent, or Firm*—Patterson & Sheridan, L.L.P.

(57) ABSTRACT

In a first aspect, the present invention comprises an optical filter comprising a fiber having a core and a cladding and a light-absorbing coating applied onto a portion of the fiber cladding, the coating attenuating loosely bound cladding modes. In another aspect, the invention comprises a fiber amplifier apparatus comprising fibers for delivering pump laser light and for monitoring signal light and at least one photodetector optically coupled to a monitoring fiber, wherein either an optical filter is disposed between a monitoring fiber and a photodetector or at least one of the fibers has a core and a cladding and a light-absorbing coating applied onto a portion of the fiber cladding. A method in accordance with the present invention includes providing an optical amplifier having fibers for delivering pump laser light and for monitoring signal light, and applying a light-absorbing coating onto a portion of one of said fibers.

30 Claims, 7 Drawing Sheets

METHOD AND APPARATUS FOR
REDUCTION OF OPTICAL COUPLING
BETWEEN PUMP LASERS AND
PHOTODETECTORS IN OPTICAL
AMPLIFIERS

FIELD OF THE INVENTION

The present invention relates to optical amplifiers used to boost optical power of light signals within optical transmission systems. More particularly, the present invention relates to optical amplifiers having improved performance of monitor photodetectors through reduced inter-fiber coupling of pump laser light into the monitor photodetectors.

BACKGROUND OF THE INVENTION

Figure 1:
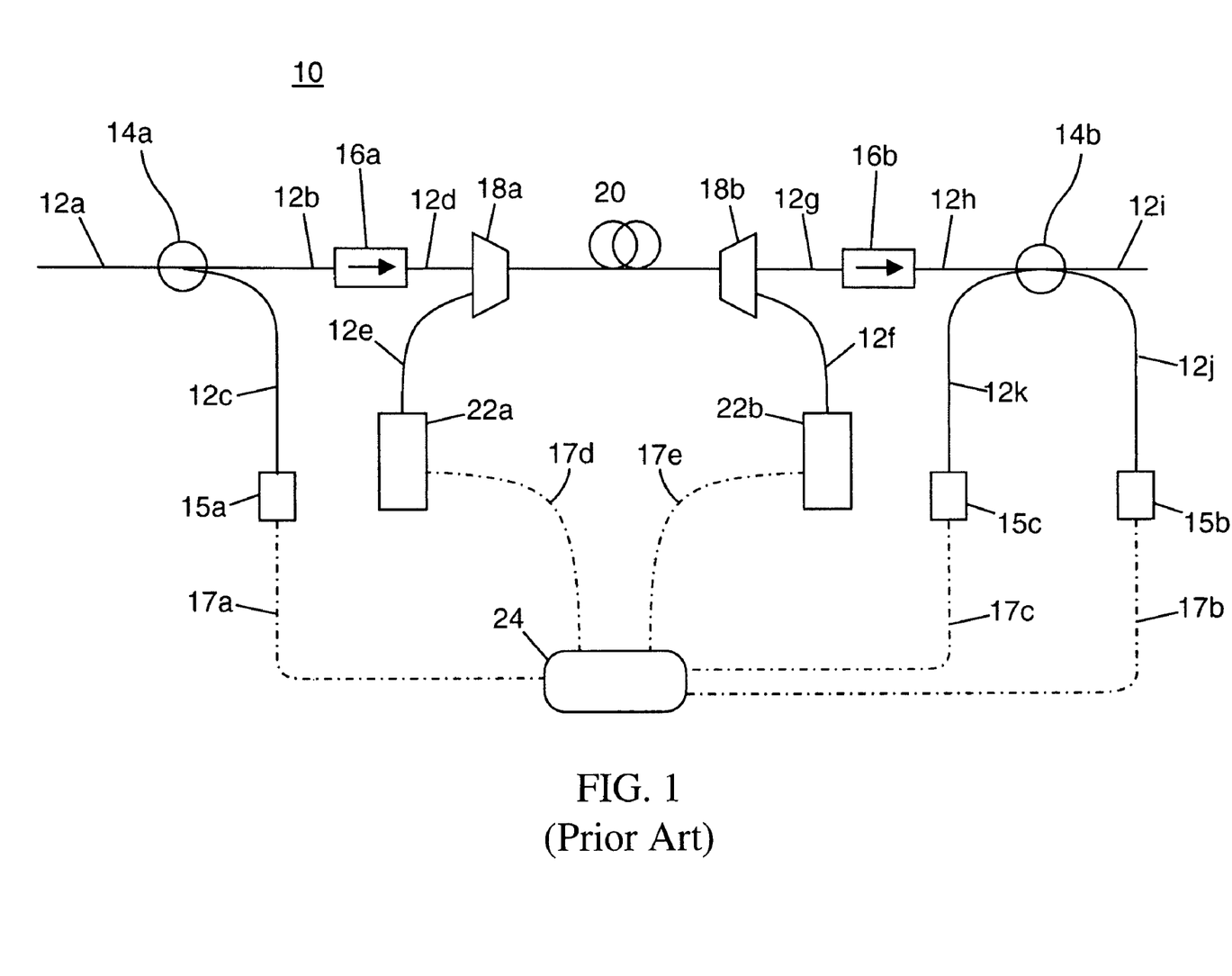
FIG. 1 is a schematic diagram of a typical optical amplifier.

Optical amplifiers are important components of fiber-optic communication systems. Erbium-doped fiber amplifier (EDFA) systems have become especially popular owing to their gain characteristics near the 1.5 μm transmission band of conventional optical fiber. An example of a typical conventional EDFA 10 is shown in FIG. 1. It is to be kept in mind that FIG. 1 is provided for example only and that, since EDFA designs are varied, not every component shown in FIG. 1 may be included in a particular EDFA design. Alternatively, more-complex EDFA designs may include additional components not shown in FIG. 1. In FIG. 1, an optical signal, typically comprising one or more wavelengths within the range of about 1527-1565 nm, is input through a first fiber 12a to a first optical coupler 14a. The optical coupler 14a delivers most of the power of the optical signal to a second optical fiber 12b but separates a small proportion (ca. 1-5%) of the original optical power to a third fiber 12c which leads to a first photodetector 15a. The main signal proportion passes through a first optical isolator 16a, which prevents amplified light and pump laser light produced within the amplifier 10 from propagating in a reverse direction to and within the first fiber 12a. The signal passing through the first isolator 16a is then delivered through fourth fiber 12d to a first multiplexer/de-multiplexer (MUX/DEMUX) 18a where it is combined with a first or co-propagating laser pump light (typically either near 980 nm or near 1480 nm) produced by first pump laser 22a and delivered to the MUX/DEMUX through fifth fiber 12e.

An Erbium-doped fiber 20 within the amplifier 10 (FIG. 1) receives both the signal light and the co-propagating laser pump light from the first MUX/DEMUX 18a. Further, the Erbium-doped fiber 20 receives a second or counter-propagating laser pump light (typically either 980 nm or 1480 nm) produced by a second pump laser 22b and delivered to the Erbium-doped fiber 20 by sixth fiber 12f and second MUX/DEMUX 18b. The co-propagating and counter-propagating pump lights travel through Erbium-doped fiber 20, respectively, in the same direction as and in the opposite direction to the optical signal.

The optical signal is amplified within the Erbium-doped fiber 20 (FIG. 1) as a result of stimulated emission caused by the pumping of Erbium-ion electrons under the combined effects of optical pumping by the two laser pump lights. The amplified optical signal is separated from the second pump light by the second MUX/DEMUX 18b and is delivered to the second optical isolator 16b through the seventh fiber 12g. The second optical isolator 16b prevents any reflected signal light from being inadvertently input to the Er-doped fiber where it would be amplified and possibly contaminate the signal light. After passing through the second isolator 16b, the amplified signal light passes to second optical coupler 14b via the eighth fiber 12h. The second optical coupler 14b delivers most of the optical power of the amplified signal light to the ninth or output fiber 12i. However, the second coupler also removes a small sample proportion of the amplified optical signal to a second photodetector 15b via a tenth fiber 12j and removes a small sample proportion of any reflected signal light to third photodetector 15c via an eleventh fiber 12k.

Each of the photodetectors 15a-15c within the EDFA 10 produces an electrical signal that is proportional to or in relation to the optical power of the sample light received by the respective photodetector. The electrical signals produced by the photodetectors 15a-15c are delivered to a control module 24 via electrical lines 17a-17c, respectively. The control module 24 monitors the amplifier system performance based upon these input electrical signals and optimizes the overall amplifier performance by sending control signals to the pump lasers 22a-22b via the electrical lines 17d-17e, respectively.

Figure 2:
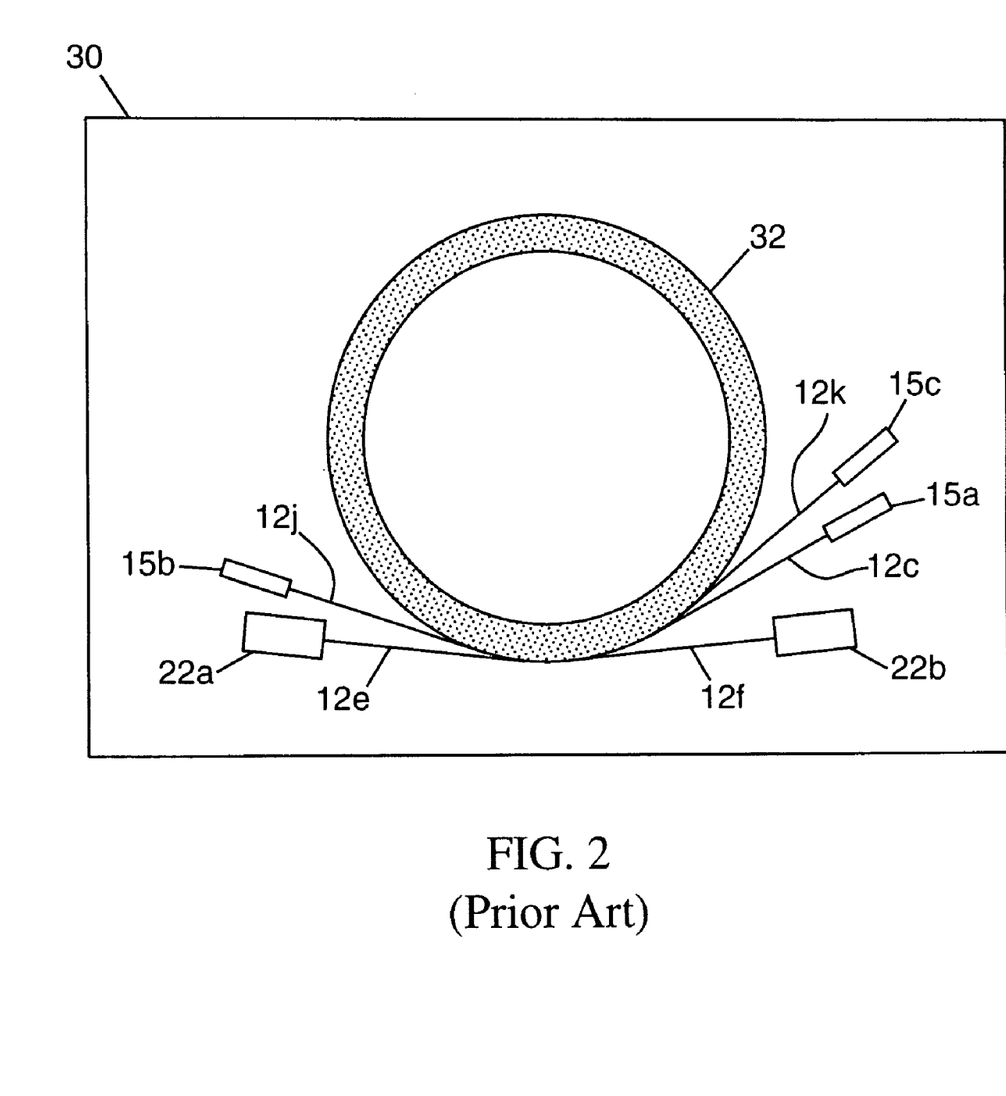
FIG. 2 is a diagram of a housing for the optical amplifier of FIG. 1, also showing the pump lasers, photodetectors and associated pigtail fibers of the amplifier.

Since physical space within an optical amplifier installation may be severely limited, the many components comprising the EDFA 10 may be arranged in close proximity to one another in a configuration designed to make the best use of all available space. FIG. 2 shows an example of a housing configuration for an EDFA. The optical and electronic components of the EDFA are housed within a container 30 that contains an internal spool 32 upon which the various fibers are wound. The relatively bulky pump lasers 22a-22b and photodetectors 15a-15c are generally mounted upon a printed circuit board secured to the inside of a wall of the container 30 and the various "pigtail" fibers 12c, 12e, 12f, 12j, 12k that connect to these lasers and photodetectors emerge tangentially from the fiber windings around the spool 32. The Er-doped fiber as well as the remaining isolator, coupler, MUX/DEMUX, remaining fiber lengths and any splices between these components, none of which are explicitly shown on FIG. 2 but which are assumed to be present, are housed on or within the spool 32.

The close proximity of components within the conventional optical amplifier configuration (FIGS. 1-2) presents some problems in terms of unwanted light transfer between components. For instance, when viewed with an IR viewer, the inventor has noted that stray pump laser light "leaks" from the system at a number of different locations, including near the pump housing and in the vicinity of splices and couplings between fibers or between fibers and other components. By far the largest power flux is from the initial coupling of a pump laser 22a-22b into the fiber pigtail 12e-12f to which it is directly coupled.

Figure 3:
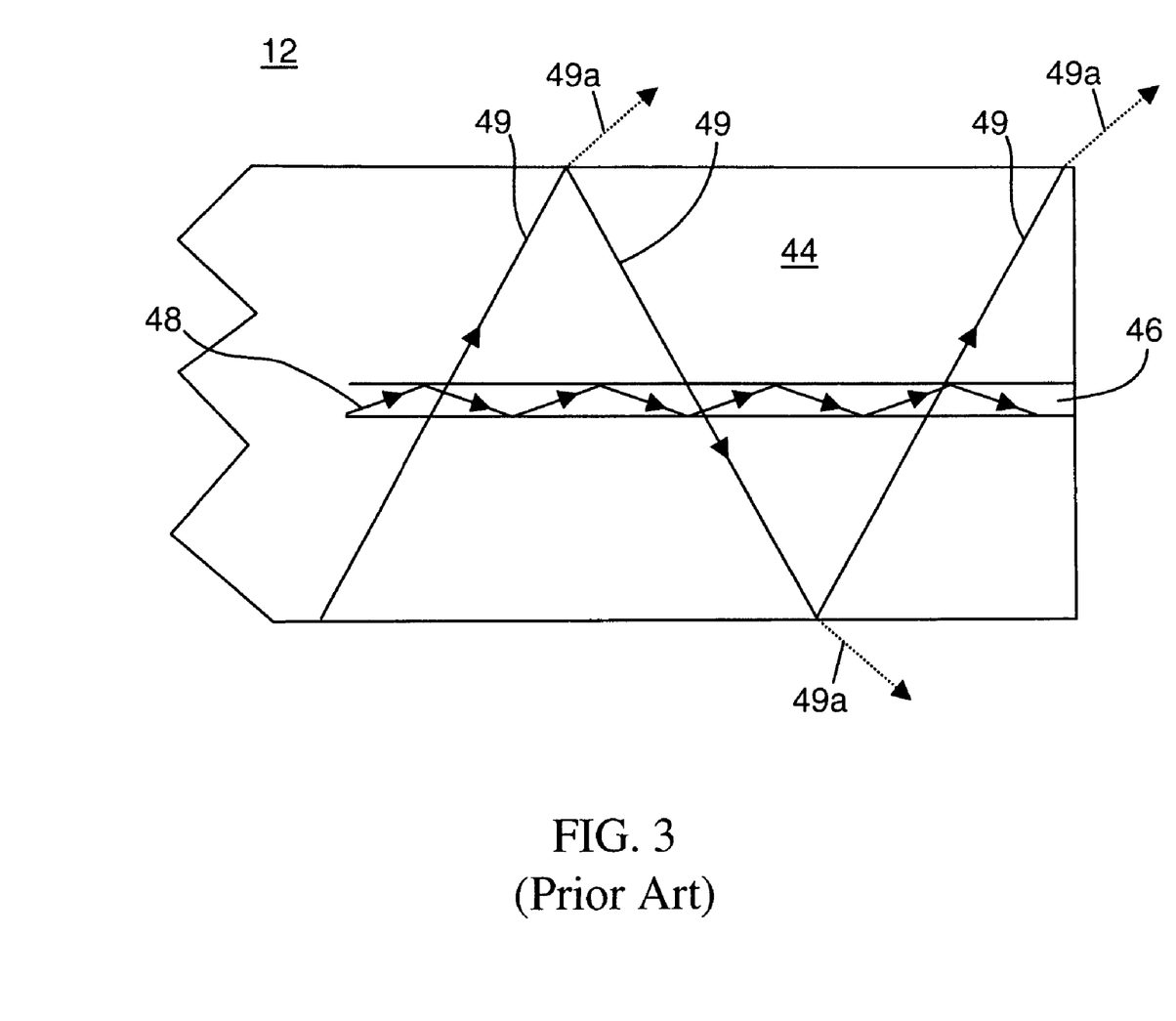
FIG. 3 is a drawing of signal and laser pump light propagation within a conventional pigtail fiber within an optical amplifier.

The unwanted and leaking pump light primarily resides within very loosely bound cladding modes within the various fibers. The term "cladding mode" as used herein, is not meant to be limited to light propagating exclusively within the cladding but may also include light that propagates within other components of the optical fiber—such as protective acrylate coatings—in addition to the cladding. This cladding mode propagation arises because the coupling from the pump lasers 22a-22b into the cores of the pump laser pigtail fibers 12e-12f is not 100% efficient and a significant proportion of the laser power is launched into the cladding and coating of the fibers. Some of this power is not in a truly guided mode and the cladding and coating are acting more like a lossy "light pipe". The propagation of signal light and stray pump laser light within a pigtail fiber 12 is illustrated in greater detail in FIG. 3. The fiber 12 shown in FIG. 3 comprises a conventional optical fiber having a core 46 surrounded by a cladding 44. A first light 48 propagates in one or more conventional guided modes within the core 46. A second light 49 propagates in loosely bound cladding modes within both the core 46 and cladding 44. If the pigtail fiber 12 shown in FIG. 3 is one of the pump laser pigtail fibers 12e-12f, then the first light 48 and the second light 49 comprise the same wavelength, generally around 980 nm or 1480 mm. If the pigtail fiber 12 of FIG. 3 is one of the other fibers, such as one of the fibers 12c, 12j, 12k that couple directly to the photodetectors, then the second light will be at the wavelength emitted by a pump laser (980 nm or 1480 nm) and the first light 48 will comprise a wavelength utilized for optical signal transmission, generally within the well-known "C" band ranging from about 1527-1565 nm.

Within the pigtail fiber 12 (FIG. 3), the first light 48 is constrained to propagate near the core, constrained by wave guide principles. However, a proportion 49a of the second light 49 may exit through the cladding air interface and thereby exit the fiber 12. This light 49a may then be available to enter the cladding of any other fiber that may be adjacent to the fiber 12, in a fashion that is just the reverse of the light loss phenomenon shown in FIG. 3. Although a bare optical fiber is indicated in FIG. 3, the fiber may have an outer coating surrounding the cladding 44, such as those that are commonly used to protect the fiber from mechanical breakage or chemical attack. In such a case, the second light may also propagate within loosely bound modes that include the coating, since such coatings are generally transparent to infrared light. The leakage of pump laser light illustrated in FIG. 3 presents a difficulty and potential disadvantage regardless of whether the fiber 12 is coated or uncoated.

Thus, when observed with an IR viewer, various pigtail fibers appear to "glow" over a length of several centimeters, indicating that light is being emitted outward from cladding modes over such a length. If another piece of fiber is near this "glowing" fiber, some of the light is coupled into this second fiber's cladding or coating and can propagate therein for many centimeters. If this second fiber happens to be the pigtail from one of the monitor photodiodes 15a-15c, then, when the pump is turned on, there is a coupling of pump light into this monitor photodiode. Since the pump laser light can be orders of magnitude higher in power in comparison to the optical signals that the monitor photodiodes are designed to detect, even a small amount of such leakage can perturb the photodiode signals and, as a result, the operation of the EDFA as a whole.

Complicating the pump laser leakage problem noted above is the fact that many EDFA's are dual-stage or multi-stage amplifiers comprising additional pump lasers and monitor photodiodes and having additional components, such as gain-flattening filters or mid-stage access ports. The resulting duplication of components and fibers (relative to those shown in FIG. 1) and the provision of additional components as well as the splices or couplers between such components causes even more opportunities for light cross contamination within the housing configuration shown in FIG. 2.

Conventional means of solving the pump laser light leakage and contamination problem noted above include choosing fiber components having a coating or covering thereupon, prior to assembling the amplifier, in order to prevent the cross-fiber coupling or else mechanically separating the various fibers that may be subject to inter-fiber coupling cross contamination. Either of these methods can adequately remove the unwanted laser pump contamination light before it reaches the photodetectors.

The use of a cover or coating on the fiber (so as to prevent the coupling) disadvantageously requires that very long sections of fiber be so covered or coated in order to assure that no coupling takes place within any section of any of the various fibers. Most of such covering or coating will be unnecessary since potential inter-fiber coupling only occurs at certain locations. Further, if any inter-fiber optical coupling should occur at some point because of, for instance, a break in the covering or coating, then the remaining covering or coating will be rendered useless since it cannot remove the contamination light once it has entered a fiber.

Finally mechanical separation of fibers adds significant additional bulk to the overall apparatus.

SUMMARY OF THE INVENTION

To overcome the inter-fiber coupling problems noted above, the present disclosure provides an improved method and apparatus for reduction of optical coupling between pump lasers and photodetectors in optical amplifiers. In a first aspect, a preferred embodiment of a filter apparatus in accordance with the present invention comprises a fiber having a core and a cladding and a light-absorbing coating applied onto a portion of the fiber cladding. Preferably, the light-absorbing coating comprises a permanent marking fluid or marking ink.

In another aspect, a preferred embodiment of a fiber amplifier apparatus in accordance with the present invention comprises an optical gain medium having a first end and a second end; an input fiber optically coupled to and delivering an optical signal to the first end; an output fiber optically coupled to and receiving an amplified optical signal from the second end; at least one pump light fiber optically coupled to the optical gain medium and delivering pump laser light to the optical gain medium; at least one monitor fiber optically coupled to one of the input fiber and the output fiber; and at least one photodetector optically coupled to the at least one monitor fiber, wherein at least one of the at least one pump light fiber and the at least one monitor fiber has a core and a cladding and a light-absorbing coating applied onto a portion of the cladding. Preferably, the light absorbing coating comprises a marking fluid or marking ink.

A second preferred embodiment of a fiber amplifier apparatus in accordance with the present invention comprises an optical gain medium having a first end and a second end; an input fiber optically coupled to and delivering an optical signal to the first end; an output fiber optically coupled to and receiving an amplified optical signal from the second end; at least one pump light fiber optically coupled to the optical gain medium and delivering pump laser light to the optical gain medium; at least one monitor fiber optically coupled to one of the input fiber and the output fiber; at least one photodetector optically coupled to at least one monitor fiber; and at least one optical filter optically coupled between a monitor fiber and a photodetector. An optical filter within the second preferred embodiment of a fiber amplifier transmits signal light to the photodetector and prevents transmission of pump laser light to the photodetector. Such a filter may either be a bandpass filter or a long-wave pass filter.

A method, in accordance with the present invention, of reducing optical coupling between pump lasers and photodetectors in optical amplifiers comprises the steps of providing an optical amplifier comprising an optical gain medium having a first end and a second end; an input fiber optically coupled to and delivering an optical signal to the first end; an output fiber optically coupled to and receiving an amplified optical signal from the second end; at least one pump light fiber optically coupled to the optical gain medium and delivering pump laser light to the optical gain medium; at least one monitor fiber optically coupled to one of the input fiber and the output fiber; and at least one photodetector optically coupled to the at least one monitor fiber; and applying a light-absorbing coating to a portion of a cladding of at least one of the at least one pump light fiber and the at least one monitor fiber. Preferably, the light-absorbing coating comprises a marking fluid or marking ink.

The light-absorbing coating applied to the cladding of either or both of the at least one pump light fiber and the at least one monitor fiber serves to reduce coupled light in at least one of three possible ways: (1) attenuation of light leaving the pump light fiber or propagating within the cladding or coating of the pump light fiber; (2) prevention of the entry of ambient pump laser into the monitor fiber; and/or (3) attenuation of unwanted light propagating in the monitor fiber.

BRIEF DESCRIPTION OF THE DRAWINGS

The object and features of the present invention can be more fully understood and better appreciated with reference to the attached drawings, which are meant to be illustrative of the invention and not necessarily drawn to scale, wherein.

DETAILED DESCRIPTION OF THE PREFERRED EMBODIMENTS

The present invention relates to an improved method and apparatus for reduction of optical coupling between pump lasers and photodetectors in optical amplifiers. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein. To more particularly appreciate the features and advantages of the present invention, the reader is referred to the appended FIGS. 4-7 in conjunction with the following discussion.

Figure 4:
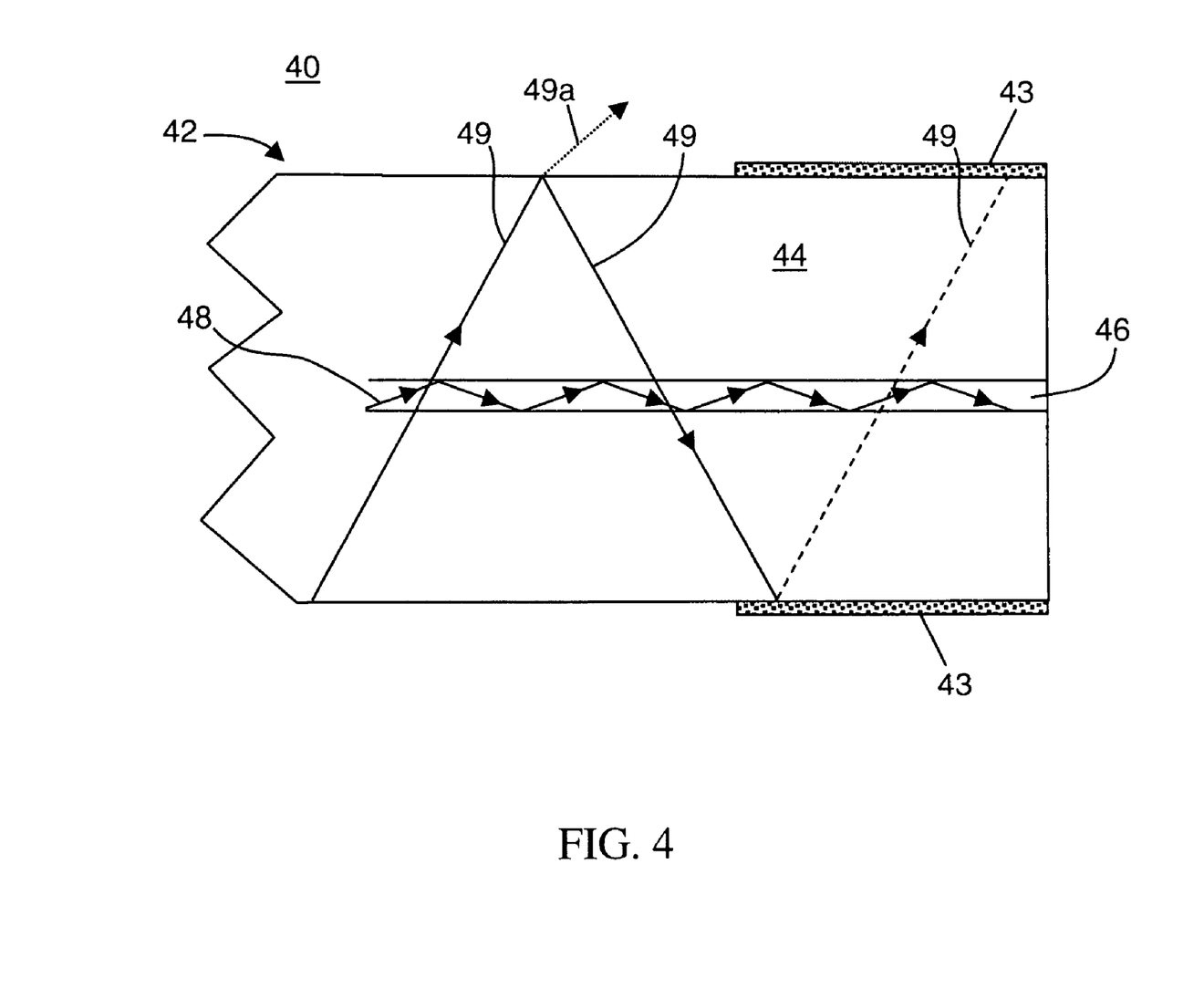
FIG. 4 is a drawing of a first preferred embodiment of an optical filter apparatus in accordance with the present invention.

FIG. 4 is a drawing of a first preferred embodiment of an optical filter apparatus in accordance with the present invention. The optical filter 40 shown in FIG. 4 comprises an optical fiber 42 comprising a core 46 surrounded by a cladding 44. A first light 48 propagates in one or more conventional guided modes within the core 46. A second light 49 propagates in loosely bound cladding modes that may also include the core 46 and any IR-transmitting coatings in addition to the cladding 44. A light absorbing coating 43 that absorbs light at the wavelength of the second light 49 is applied to a portion of the cladding 44 of the fiber 42. As the second light 49 encounters the outer edge of the cladding, it also encounters the light absorbing coating and experiences attenuation. The first light 48 is unaffected by the light absorbing coating because it is "bound" in the core and so does not encounter the light absorbing coating 43.

The light absorbing coating of the optical filter 40 shown in FIG. 4 can fulfill three functions simultaneously: (1) it attenuates light propagating in loosely bound cladding modes from exiting a fiber through the cladding from which it could inadvertently coupling into an adjacent fiber; (2) it attenuates unwanted light propagating in cladding modes even after such light has been coupled into a fiber; and (3) it reduces light leaking from any adjacent fibers from entering the fiber having said coating. The inventor has determined that commonly available permanent marking fluid or marking ink, such as is commercially available for marking documents by hand, gives good results when used as the light absorbing coating 43. By far the best optical performance is obtained by using the black marker. However, any coating that attenuates the light at the wavelength of the pump laser would provide some benefit.

The filter 40 (FIG. 4) has several advantages relative to prior art filtering apparatuses and methods. Firstly, preparation of the filter 40 from an ordinary fiber is easy and inexpensive: The preferred materials used for the light absorbing coating 43 are virtually free when the costs are spread out over the preparation of many such filters. Further, the technique of applying a light absorbing coating to pigtail fibers is similar to methods currently employed to color-code fiber pigtails for ready identification. Secondly, utilization of the filter 40 does not have any adverse impact upon signal light 48, since no additional optics are placed in the signal path. This property is in contrast to the prior-art technique of utilizing additional conventional filters, such as thin-film filters, in the signal light path, whose use would degrade the signal light power to some extent. Thirdly, the filter 40 both reduces initial coupling and attenuates light that has already been coupled into a fiber, thereby providing an extra level of defense.

Figure 5:
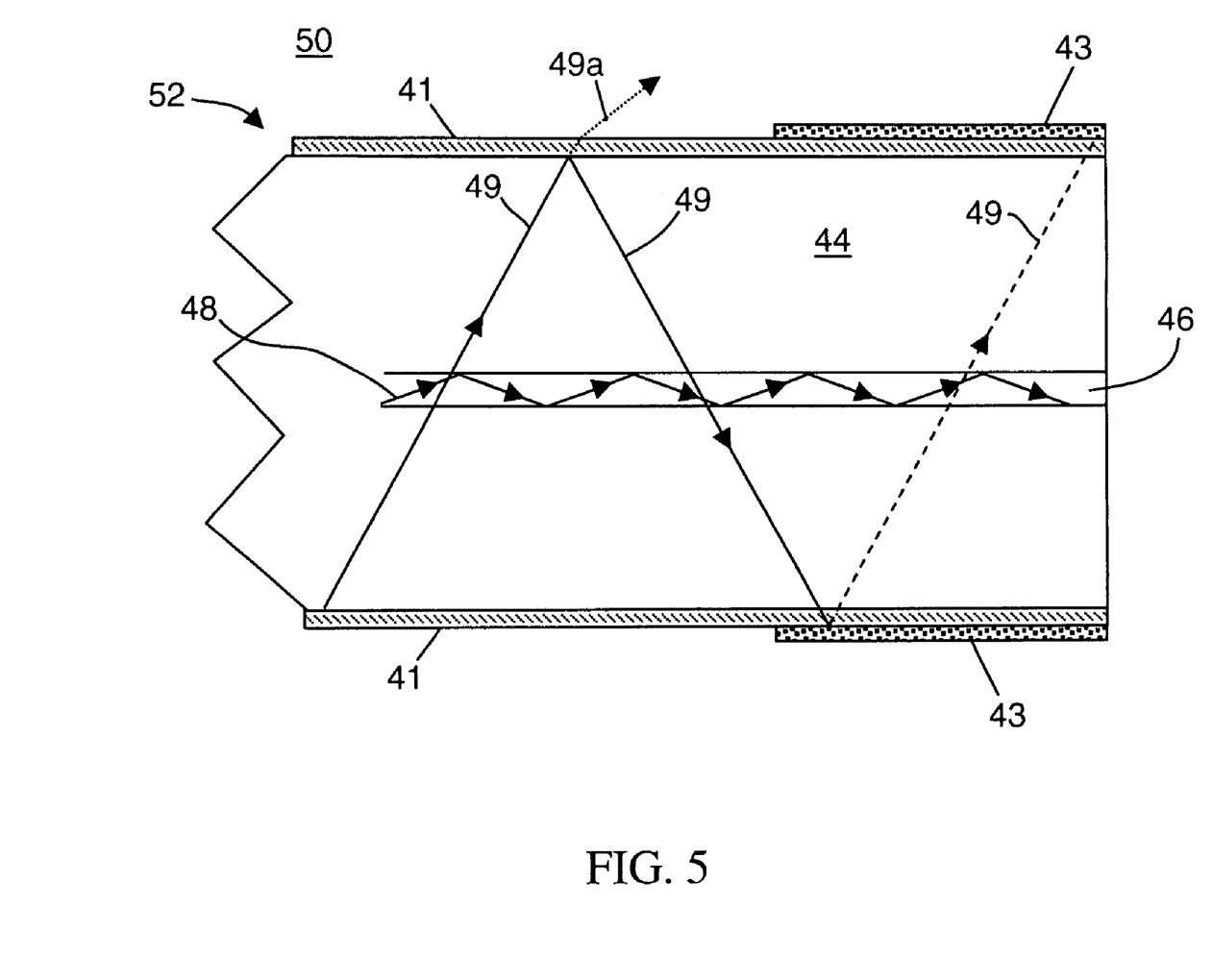
FIG. 5 is a drawing of a second preferred embodiment of an optical filter apparatus in accordance with the present invention.

FIG. 5 shows second preferred embodiment of an optical filter apparatus in accordance with the present invention. The filter 50, shown in FIG. 5, is similar to the filter 40, already illustrated in FIG. 4 and discussed in reference thereto, except that the fiber 52 comprising the filter 50 has a protective coating 41 surrounding the cladding. As has been previously mentioned, commercially available fibers are often provided with such a protective coating to guard against mechanical damage or chemical attack to the glass comprising the fiber 52. In the filter 50, the light absorbing coating 43 is applied to the outside of the protective coating 41. The light absorbing coating 43 operates in the same fashion and provides the same benefits as previously described for the filter 40.

Figure 6:
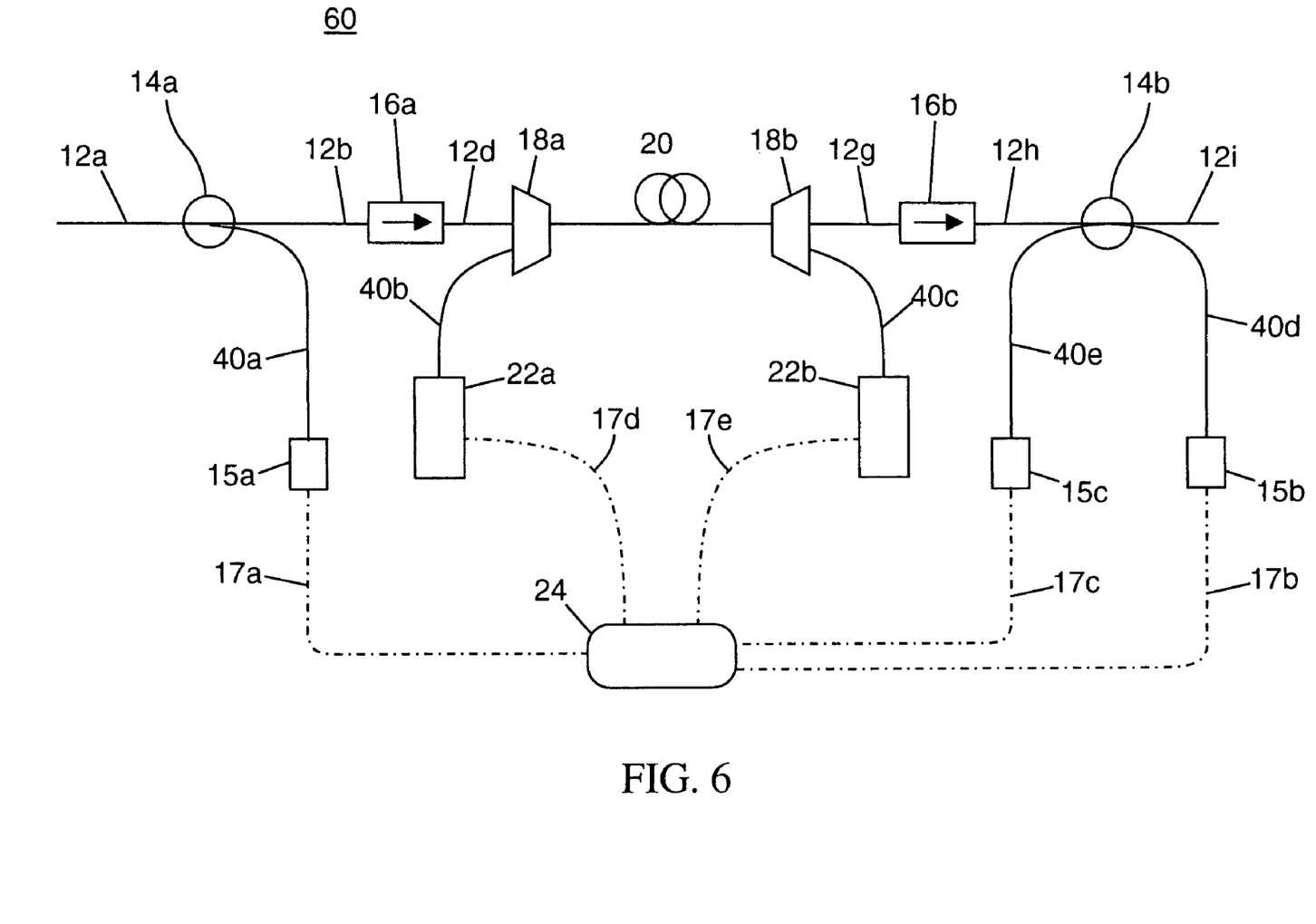
FIG. 6 is a diagram of a first preferred embodiment of an optical amplifier apparatus in accordance with the present invention.

FIG. 6 is a diagram of a first preferred embodiment of an optical amplifier apparatus in accordance with the present invention. The optical amplifier apparatus 60 shown in FIG. 6 is constructed similarly to the conventional apparatus 10 shown in FIG. 1 except that, whereas the pigtail fibers leading to the pump lasers and photodetectors within the conventional apparatus 10 are all conventional fibers, these pigtail fibers are all replaced by filters 40 (FIG. 4) or, alternatively, by filters 50 (FIG. 5) in accordance with the present invention. More precisely, in the optical amplifier apparatus 60, the filters 40a, 40b, 40c, 40d and 40e are optically coupled between the first optical coupler 14a and the first photodetector 15a, between the first MUX/DEMUX 18a and the first pump laser 22a, between the second MUX/DEMUX 18b and the second pump laser 22b, between the second optical coupler 14b and the second photodetector 15b and between the second optical coupler 14b and the third photodetector 15c, respectively. The operation of the amplifier apparatus 60 is especially advantageous when housed as illustrated in FIG. 2.

Although all the filters shown in FIG. 6 comprise the filter 40, the filter 50 could be used in place of one or more of these. To fabricate the optical amplifier apparatus 60, an optically absorbing coating is applied to the outside of all the relevant pigtail fibers, thereby converting said fibers into filters as shown in FIGS. 5-6. Therefore, there is no need to assemble the optical amplifier components using off-the-shelf coated fibers. Further, the configuration of the optical amplifier apparatus 60 shown in FIG. 6 could be modified in many ways that might require more or fewer pump lasers or monitor photodetectors. The novel aspects of the present invention are retained, however, provided that one or more of the filter 40 or the filter 50 are utilized.

Figure 7:
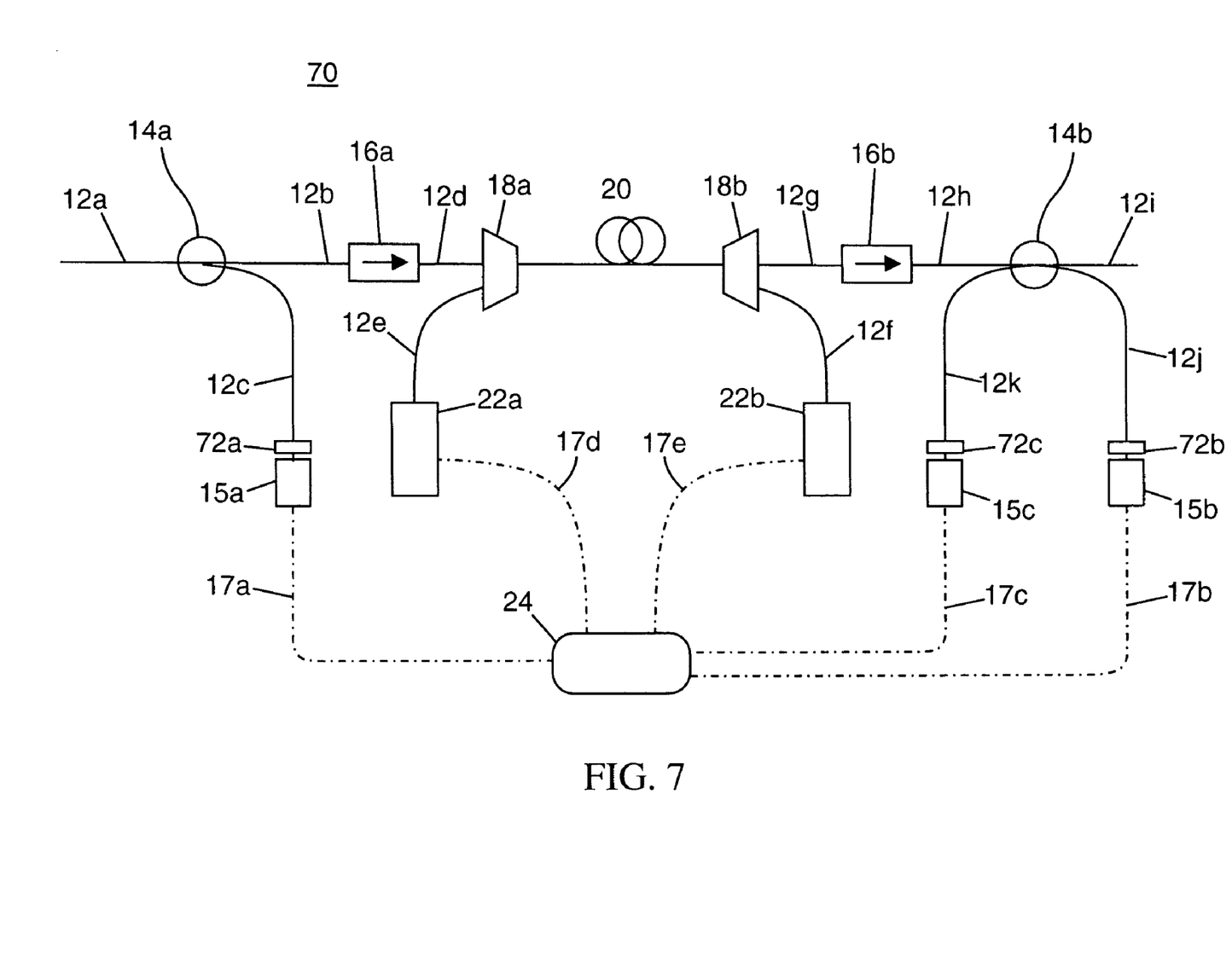
FIG. 7 is a diagram of a second preferred embodiment of an optical amplifier apparatus in accordance with the present invention.

FIG. 7 is a diagram of a second preferred embodiment of an optical amplifier apparatus in accordance with the present invention. The optical amplifier apparatus 70 shown in FIG. 7 is constructed similarly to the conventional apparatus 10 shown in FIG. 1 except that conventional optical filters 72a-72c, preferably thin film filters, are optically coupled to the inputs of the photodetectors 15a-15c, respectively. Not every one of the filters 72a-72c need be present. Each one of the filters 72a-72c transmits signal wavelengths, from 1527-1565 nm, to the photodetector to which it is coupled but prevents transmission of pump laser light, near either 980 nm or 1480 nm, to the photodetector.

Any one of the filters 72a-72c may comprise either a conventional bandpass filter or a conventional long-wave pass filter. A bandpass filter is a filter with a transmission that is high for a particular band of wavelengths, but that falls to low values above and below this band. A long-wave pass filter is a filter that is transparent to longer wavelengths but opaque to shorter wavelengths. Further, any one of the filters 72a-72c may be either be a discrete component, physically separate from a photodetector, or else may be housed together with its associated photodetector within a single integrated housing or package.

In operation of the amplifer 70, one or more of the fibers 12c, 12j and 12k may carry unwanted pump laser radiation in addition to the desired signal light as a result of optical coupling as described previously herein. The filter 72a, for instance, which is optically coupled between the fiber 12c and the photodetector 15a prevents transmission of the pump laser radiation (near either 980 nm or 1480 nm) to the photodetector 15a but permits transmission of signal light in the range of 1527-1565 nm to the photodetector 15a. The filters 72b and 72c, which are optically coupled between the fiber 12j and the photodetector 15b and between the fiber 12k and the photodetector 15c, operate in similar fashion.

An improved method and apparatus for reduction of optical coupling between pump lasers and photodetectors in optical amplifiers has been disclosed. Although the present invention has been described in accordance with the embodiments shown and discussed, one of ordinary skill in the art will readily recognize that there could be variations to the embodiments and those variations would be within the spirit and scope of the present invention. Accordingly, many modifications may be made by one of ordinary skill in the art without departing from the spirit and scope of the invention, which is defined by the appended claims.

What is claimed is:

1. An optical amplifier comprising:
    an optical gain medium connected to an input optical fiber and an output optical fiber;
    an optical coupler connected to the optical gain medium between the input and output optical fibers;
    a pump member optically coupled to the optical gain medium via a first filter member to deliver a pump laser light to the optical gain medium, the first filter member including a first length portion and a second length portion, wherein the second length portion is proximate a location where the pump member is optically coupled to the first filter member and a light-absorbing coating is applied to the second length portion and is not applied to the first length portion; and
    a photodetector optically coupled to the optical coupler via a second filter member, wherein the photodetector receives an optical signal and produces an electrical signal proportional to the optical signal.

2. The optical amplifier of claim 1, wherein the second portion of the first filter member is proximate a location where the pump member is optically coupled to the first filter member.

3. The optical amplifier of claim 1, wherein the first filter member comprises a core and a cladding surrounding the core, wherein the light-absorbing coating is disposed upon a portion of the cladding such that the light absorbing coating attenuates a light propagating through the cladding.

4. The optical amplifier of claim 1, wherein the first filter member comprises a core and a cladding with a protective coating, wherein the light-absorbing coating is disposed upon a portion of the protective coating such that the light absorbing coating attenuates a light propagating through the protective coating.

5. The optical amplifier of claim 1, wherein the first filter member comprises a core and a cladding surrounding the core, wherein the light-absorbing coating is disposed upon a portion of the cladding such that the light absorbing coating reduces light leaking from an adjacent fiber from entering the first filter member.

6. The optical amplifier of claim 1, wherein the light-absorbing coating is marking ink.

7. The optical amplifier of claim 1, wherein the second filter member has a light absorbing coating applied only to a portion of its length proximate a location where the photodetector is optically coupled to the second filter member.

8. The optical amplifier of claim 7, wherein the second filter member comprises a core and a cladding surrounding the core, wherein the light-absorbing coating is disposed upon a portion of the cladding such that the light absorbing coating attenuates a light propagating through the cladding.

9. The optical amplifier of claim 7, wherein the second filter member comprises a core and a cladding with a protective coating, wherein the light-absorbing coating is disposed upon a portion of the protective coating such that the light absorbing coating attenuates a light propagating through the protective coating.

10. The optical amplifier of claim 7, wherein the first filter member comprises a core and a cladding surrounding the core, wherein the light-absorbing coating is disposed upon a portion of the cladding such that the light absorbing coating reduces light leaking from an adjacent fiber from entering the first filter member.

11. The optical amplifier of claim 7, wherein the light-absorbing coating marking fluid.

12. The optical amplifier of claim 1, wherein the input fiber delivers an optical signal to the optical gain medium and the optical coupler directs a portion of the optical signal to the second filter member.

13. An optical amplifier comprising:
   an optical gain medium connected to an input optical fiber and an output optical fiber;
   an optical coupler connected to the optical gain medium between the input and output optical fibers;
   a first filter member configured to optically couple a pump member to the optical coupler, the first filter member having a first length portion and a second length portion, wherein the second portion is proximate a location where the pump member is optically coupled to the first filter member and a light-absorbing coating is applied to the second length portion and is not applied to the first length portion; and
   a second filter member configured to optically couple a photodetector to the optical coupler, wherein the second filter member has a light-absorbing coating applied only to a portion of its length proximate a location where the photodetector is optically coupled to the second filter member.

14. The optical amplifier of claim 13, wherein each filter member comprises a core and a cladding surrounding the core, wherein the light-absorbing coating is disposed upon a portion of the cladding such that the light absorbing coating attenuates a light propagating through the cladding.

15. The optical amplifier of claim 13, wherein each filter member comprises a core and a cladding with a protective coating, wherein the light-absorbing coating is disposed upon a portion of the protective coating such that the light absorbing coating attenuates a light propagating through the protective coating.

16. The optical amplifier of claim 13, wherein each filter member comprises a core and a cladding surrounding the core, wherein the light-absorbing coating is disposed upon a portion of the cladding such that the light absorbing coating reduces light leaking from an adjacent fiber from entering the first filter member.

17. The optical amplifier of claim 13, wherein the light-absorbing coating marking fluid.

18. The optical amplifier of claim 13, wherein the pump member delivers a pump laser light to the optical gain medium.

19. The optical amplifier of claim 13, wherein the photodetector receives an optical signal and produces an electrical signal proportional to the optical signal.

20. An optical amplifier comprising:
   an optical gain medium connected to an input optical fiber and an output optical fiber;
   an optical coupler connected to the optical gain medium between the input and output optical fibers;
   a photodetector configured to receive an optical signal and produce an electrical signal proportional to the optical signal;
   a filter member configured to optically couple the photodetector to the optical coupler, the filter member having a first length portion and a second length portion, wherein the second portion is proximate a location where the photodetector is optically coupled to the filter member and a light-absorbing coating is applied to the second length portion and is not applied to the first length portion; and
   a pump member configured to deliver a pump laser light to the optical gain medium.

21. The optical amplifier of claim 20, further comprising a second filter member configured to optically couple the pump member to the optical gain medium, wherein the second filter member includes a first length portion and a second length portion, wherein the second portion is proximate a location where the pump member is optically coupled to the second filter member and a light-absorbing coating is applied to the second length portion and is not applied to the first length portion.

22. The optical amplifier of claim 20, wherein the input fiber delivers an optical signal to the optical gain medium and the optical coupler directs a portion of the optical signal to the photodetector.

23. The optical amplifier of claim 22, wherein the filter member is configured to allow the transmission of the optical signal to the photodector.

24. The optical amplifier of claim 23, wherein the transmission of the optical signal to the photodetector is between 1527-1565 nm.

25. The optical amplifier of claim 22, wherein the photodetector is configured to produce an electrical signal proportional to the optical signal received.

26. The optical amplifier of claim 25, further including a control module configured to monitor the performance of the optical amplifier by analyzing the electrical signal sent by the photodetector.

27. The optical amplifier of claim 20, wherein the filter member comprises a core and a cladding surrounding the core, wherein the light-absorbing coating is disposed upon a portion of the cladding such that the light absorbing coating attenuates a light propagating through the cladding.

28. The optical amplifier of claim 20, wherein the filter member comprises a core and a cladding with a protective coating, wherein the light-absorbing coating is disposed upon a portion of the protective coating such that the light absorbing coating attenuates a light propagating through the protective coating.

29. The optical amplifier of claim 20, wherein the filter member comprises a core and a cladding surrounding the core, wherein the light-absorbing coating is disposed upon a portion of the cladding such that the light absorbing coating reduces light leaking from an adjacent fiber from entering the first filter member.

30. The optical amplifier of claim 20, wherein the light-absorbing coating is marking ink.

* * * * *